United States Patent [19]
Finley

[11] 4,100,342
[45] Jul. 11, 1978

[54] PROCESS OF PRODUCING DEXTRIN CARBOXYLATES

[75] Inventor: Joseph H. Finley, Metuchen, N.J.

[73] Assignee: FMC Corporation, Philadelphia, Pa.

[21] Appl. No.: 712,853

[22] Filed: Aug. 9, 1976

[51] Int. Cl.$^2$ .................. C08D 37/16; C07H 13/10
[52] U.S. Cl. ............................... 536/103; 536/115
[58] Field of Search ............... 536/115, 110, 106, 107, 536/103; 560/98, 198, 204

[56] References Cited

U.S. PATENT DOCUMENTS

| 3,720,663 | 3/1973 | Tessler | 536/106 |
|---|---|---|---|
| 3,919,107 | 11/1975 | Thompson | 536/103 |

OTHER PUBLICATIONS

*Kirk–Othmer*, vol. 8, Encylopedia of Chemical Tech. Interscience Publishers, N.Y., pp. 335–337 & 366.

Advances in Carbohydrate Chemistry, Whislter, R. vol. 1, 1945 Academ Press Inc., pp. 284–286.

*Primary Examiner*—Henry R. Jiles
*Assistant Examiner*—Cary Owens
*Attorney, Agent, or Firm*—Robert D. Jackson; Frank Ianno

[57] ABSTRACT

Dextrin carboxylates having about 20 to 100 anhydroglucose units of which from about 2.2 to about 3.0 average OH groups per unit are esterified through one of the carboxyls of a non-aromatic polycarboxylic acid of 2–4 carboxyls containing 2 to 10 carbon atoms, are prepared by (1) reacting the dextrin with at least about 2.8 moles of the anhydride of the polycarboxylic acid in acetic acid in the presence of a tertiary amine catalyst and (2) adding the reaction mixture to a solvent which precipitates the dextrin carboxylate and (3) isolating the so-produced dextrin carboxylate.

4 Claims, No Drawings

PROCESS OF PRODUCING DEXTRIN CARBOXYLATES

This invention relates to the production of biodegradable detergent builders, particularly dextrin carboxylates.

The mechanism by which builders enhance the cleansing action of detergents is not fully understood. Although several explanations have been advanced, none of these has proved entirely satisfactory. This is not too surprising considering the complex nature of detergency and the numerous factors which contribute to overall cleansing performance. It is generally agreed that builder compounds must exhibit at least some effect in such areas as stabilization of solid soil suspension, emulsification of soil particles, the surface activity of aqueous detergent solutions, solubilization of water insoluble materials, foaming or suds-producing characteristics of the washing solution, peptization of soil agglomerates, neutralization of acid soil, and the inactivation of mineral constituents present in the washing solution. Builder materials should exhibit certain ancillary properties in order to be acceptable in current washing processes and consumer marketing techniques. Thus, a builder should preferably be white, inexpensive, non-toxic, non-corrosive, non-hygroscopic and stable to oxidizers, hot alkaline detergent solutions and spray drying operations.

Of all of the known builders the condensed inorganic phosphates find the widest commercial acceptance. Sodium tripolyphosphate is especially favored being used in both home and industrial cleansing. However, detergent phosphate is a nutrient which when discharged into natural waters, is alleged to contribute to the growth of aquatic plants. Although the ecological impact of phosphate is still being debated in scientific circles, considerable work is being done in an effort to find suitable substitutes. In general, the object is to produce biologically active substances which are metabolized by microorganisms.

A large variety or organic materials containing only carbon, hydrogen and oxygen have been examined and tested as biologically degradable builders. These include both synthetic and natural products as well as chemically modified natural products. In their chemical configuration, the materials aforesaid commonly contain a plurality of carboxylic acid functions, often as pendant groups attached to a polymer chain.

An improved class of biodegradable detergent builders are the dextrin carboxylates described in U.S. Pat. No. 3,941,771 comprising a dextrinized starch of about 20 to 100 anhydroglucose units wherein from about 2.2 to about 2.8 average OH groups per anhydroglucose unit are esterified through one of the carboxyls of a non-aromatic polycarboxylic acid of 2 to 4 carboxyls containing 4 to 10 carbon atoms. In contrast to unmodified starch carboxylates such as disclosed in German Pat. No. 2,148,279, it is easier to achieve high D.S. levels with the dextrin carboxylates. This is a significant advantage since builder performance is proportional to the D.S. value in these types of polycarboxylates.

The compounds aforesaid, including both the starch and dextrin carboxylates, are prepared by known methods and in this connection reference is made to Mullen and Pacsu, Ind. Eng. Chem. 35 381 (1943); ibid. 34 1209 (1942); Malm and Fordyce, ibid. 32 405 (1940). In general, the procedure consists in heating a cyclic anhydride of a polycarboxylic acid and starch in pyridine and precipitating the resulting acid ester from water with acid such as hydrochloric acid.

Although the prior process of preparing dextrin carboxylates is generally satisfactory, it would not be commercially feasible due to the need for handling large amounts of pyridine which is not only toxic but, as any chemical operator will testify, possessed of an exceedingly repellent odor. Manifestly, if the commerical potential of dextrin carboxylates is to be realized, a more practical method of producing them is needed.

In accordance with the present invention, there is provided a novel process of producing a dextrin carboxylate having about 20 to 100 anhydroglucose units of which from about 2.2 to about 3.0 average OH groups per unit are esterified through one of the carboxyls of a non-aromatic polycarboxylic acid of 2-4 carboxyls containing 2 to 10 carbon atoms, comprising (1) reacting the dextrin with at least about 2.8 moles of the anhydride of the polycarboxylic acid in acetic acid in the presence of a tertiary amine catalyst; (2) adding the reaction mixture to a solvent which precipitates the dextrin carboxylate and (3) isolating the so-produced dextrin carboxylate.

In carrying out the process herein, dextrin, tertiary amine and polycarboxylic acid anhydride are placed in a suitable vessel with sufficient acetic acid to dissolve the ingredients; the preferred reaction temperature is about 120° C to about 140° C; a convenient technique is to heat the reaction mixture at reflux temperature or slightly above 118.5° C which is the boiling point of acetic acid. Since the tertiary amine functions as a catalyst, only a small quantity is required, about 1 to 8 ml per mole of dextrin carboxylate being satisfactory, pyridine is the preferred amine.

The mole ratio of anhydride to dextrin should be at least about 2.8 in order to achieve D.S. values of 2.6 or more. As previously noted, the higher the D.S. value, the better the builder performance. By increasing the anhydride/dextrin mole ratio to about 8, D.S. values approaching the theoretical limit of 3.0 are attained. For practical purposes, an anhydride/dextrin mole ratio of about 3 is satisfactory.

Generally speaking, the reaction is complete after heating at about 120° C–140° C for about 2 to 4 hours; at 100° C essentially no reaction occurs over a 4 hour interval.

The dextrin carboxylate is recovered by discharging the reaction mixture into a suitable solvent that will cause it to precipitate. The solvent must also dissolve acetic acid, pyridine, unreacted anhydride as well as any carboxylic acid formed by the reaction of moisture with the anhydride; desirably, moisture is excluded from the reaction mixture to avoid hydrolysis of the anhydride. Suitable solvents for precipitating the dextrin carboxylates are lower, saturated aliphatic liquids boiling below about 100° C of which chloroform, methylchloroform and ethyl acetate are preferred. The precipitated dextrin carboxylate is isolated using known laboratory procedures such as filtration, centrifugation, decantation and the like; filtration is simple and convenient. After drying, the product is converted to its water soluble salt for use in detergent formulation as disclosed in the aforecited Finley patent.

Exemplary non-aromatic polycarboxylic acids include succinic, adipic, methylsuccinic, glutaric, maleic, citraconic, itaconic, 1,2-cyclobutane dicarboxylic acid, diglycolic or others having from 4 to 10 carbon atoms.

In view of the complex chemical configuration of the herein dextrin carboxylates, the degree of substitution (D.S. value) refers to the average number of ester carboxylates functions attached per anhydroglucose unit. Thus, a D.S. of 2.6 signifies that 260 carboxylate ester groups are present, on the average, per 100 anhydroglucose units. The distribution of the carboxylate ester groups is entirely random, some of the anhydroglucose containing less than 2.6 ester group and others containing more; up to the theoretical maximum of 3. The degree of substitution can be determined by neutralizing the acid ester function with standard alkali solutions by the known procedures.

Dextrins are well known materials which have been commercially available for many years. They are made by heating starch, either alone or in the presence of chemical reagents such as acids or enzymes. (See Water Soluble Resins, Second Ed. R. L. Davidson and M. Sittig, Ed. Second Ed. Chapter 2; Starch Chemistry and Technology Volume II, Chapter VI). These reactions fall into the following three categories:

1. Fragmentation — The starch polymer is cleaved at various points to give lower molecular weight fragments.
2. Transglucosidation — 1,4 carbon oxygen bonds are cleaved and new anhydroglucose linkages are formed at the 2, 3 or 6 positions. This is illustrated below for a 1,4 1,6 cleavage.

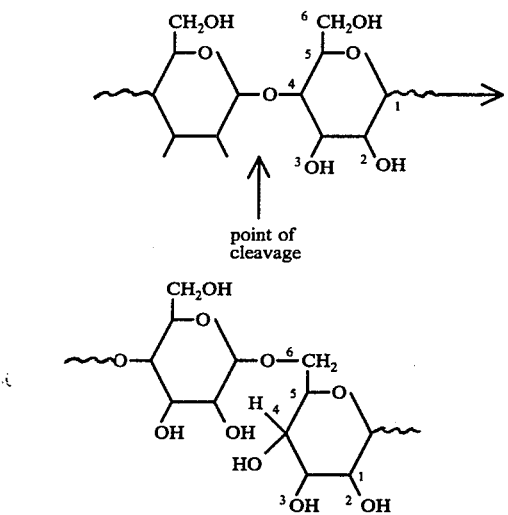

The resulting product has a more highly branched tree-like structure, that can markedly affect physical and chemical properties.

3. Repolymerization — Small fragments recombine to give higher molecular weight products. The individual steps above occur essentially sequentially rather than simultaneously during dextrinization. Steps 2 and 3 are largely thermodynamically controlled. Therefore, the extent of branching and repolymerization can be altered by varying reaction temperature. The initial fragmentation reaction (Step 1) is primarily controlled by the concentration of acid catalyst used.

As noted in the above-cited literature references, there are three types of dextrins identified as white dextrins, yellow or canary dextrins and British gums. They are classified according to the general methods used in their preparation which produce respectively: very slight, intermediate or a high degree of branching.

Within each of these three general groups, several products are available, which are classified with respect to parameters such as cold water solubility, viscosity, extent of conversion, etc.

1. White dextrins are prepared by spraying a powdered starch with acid (usually hydrochloric acid) while it is heated at 95° C–120° C for 3–8 hours. Slight to extensive fragmentation can be brought about, but little transglucosidation or repolymerization is allowed to take place. The degree of conversion with white dextrins refers to the extent of fragmentation since this is essentially the only reaction that takes place. White dextrins are a mixture of low molecular weight fragments with an average chain length of about twenty anhydroglucose units (D.P.=20).

2. Yellow or Canary Dextrins — are formed under conditions of higher heating and lower acidity than white dextrins, and are considered in the starch industry to be more highly converted, because of their increased branching than white dextrins, D.P. values are in roughly the same range as white dextrins.

3. British Gums are highly branched materials made by heating starches for long periods, i.e., 10–20 hours at 170°–195° C usually in absence of acid. D.P. values are higher than white and canary dextrins because transglucosidation and repolymerization are favored at the higher temperatures.

The following examples will further illustrate the embodiments of the invention. In these examples, unless noted otherwise, all parts given are by weight and temperatures are in degrees centigrade.

EXAMPLE I

Dextrin Succinate

Nadex 320, a white dextrin, was dried by heating to 100° C at 3mm overnight. The dry dextrin (162 g, 1.0 mole) was allowed to react with 280 g (2.8 mole) of succinic anhydride in 200 ml of acetic acid containing 4.0 ml of pyridine. After three hours, the D.S. value was found to be 2.6.

The mixture was discharged into four liters of chloroform-ethyl acetate mixture (50/50 v/v) with high speed agitation. After removing the solvent mixture by decantation, the solid residue of dextrin succinate was reslurried once in four liters of chloroform-ethyl acetate mixture and was recovered by centrifugation and dried in vacuo at room temperature.

To obtain the sodium salt, an aqueous slurry of the acid succinate was neutralized with 20% sodium hydroxide while keeping the pH below 8.5. The salt was completely soluble, giving a clear solution which, after adjustment of pH to 8.5, was evaporated to dryness to give the solid salt.

EXAMPLE II

In a reaction similar to that described in Example I, 75.2 g (0.45 mole) of dry Nadex 320 was allowed to react with 360 g (3.6 mole) of succinic anhydride in acetic acid. The reaction was catalyzed with 4.0 ml pyridine. The final product had a D.S. value of 2.9–3.0.

This example illustrates achieving near theoretical D.S. values by use of large excess of anhydride.

It is most surprising that the carboxylation of dextrins takes place in acetic acid containing only a catalytic amount of pyridine. The high degree of substitution does not occur in acetic acid alone as demonstrated by the following example.

EXAMPLE III

Following the general procedure of Example I, 54.0 g (0.33 mole) of dry Nadex 320 was allowed to react with 100 g (1.0 mole) of succinic anhydride in 67 ml of acetic acid. The final product lead a D.S. value of only 1.5 with respect to succinate.

What is claimed is:

1. In the process of producing a dextrin carboxylate having about 20 to 100 anhydroglucose units of which from about 2.2 to about 3.0 average OH groups per unit are esterified through one of the carboxyls of a non-aromatic polycarboxylic acid of 2–4 carboxyls containing 2 to 10 carbon atoms by reacting the dextrin with at least about 2.8 moles of the anhydride of the polycarboxylic acid, the improvement comprising carrying out the reaction in acetic acid in the presence of a tertiary amine catalyst.

2. The process according to claim 1 wherein the tertiary amine catalyst is pyridine.

3. The process according to claim 1 wherein the anhydride is succinic anhydride.

4. The process according to claim 1 wherein the reaction temperature is from about 120° C to about 140° C.

* * * * *